Figure 1:
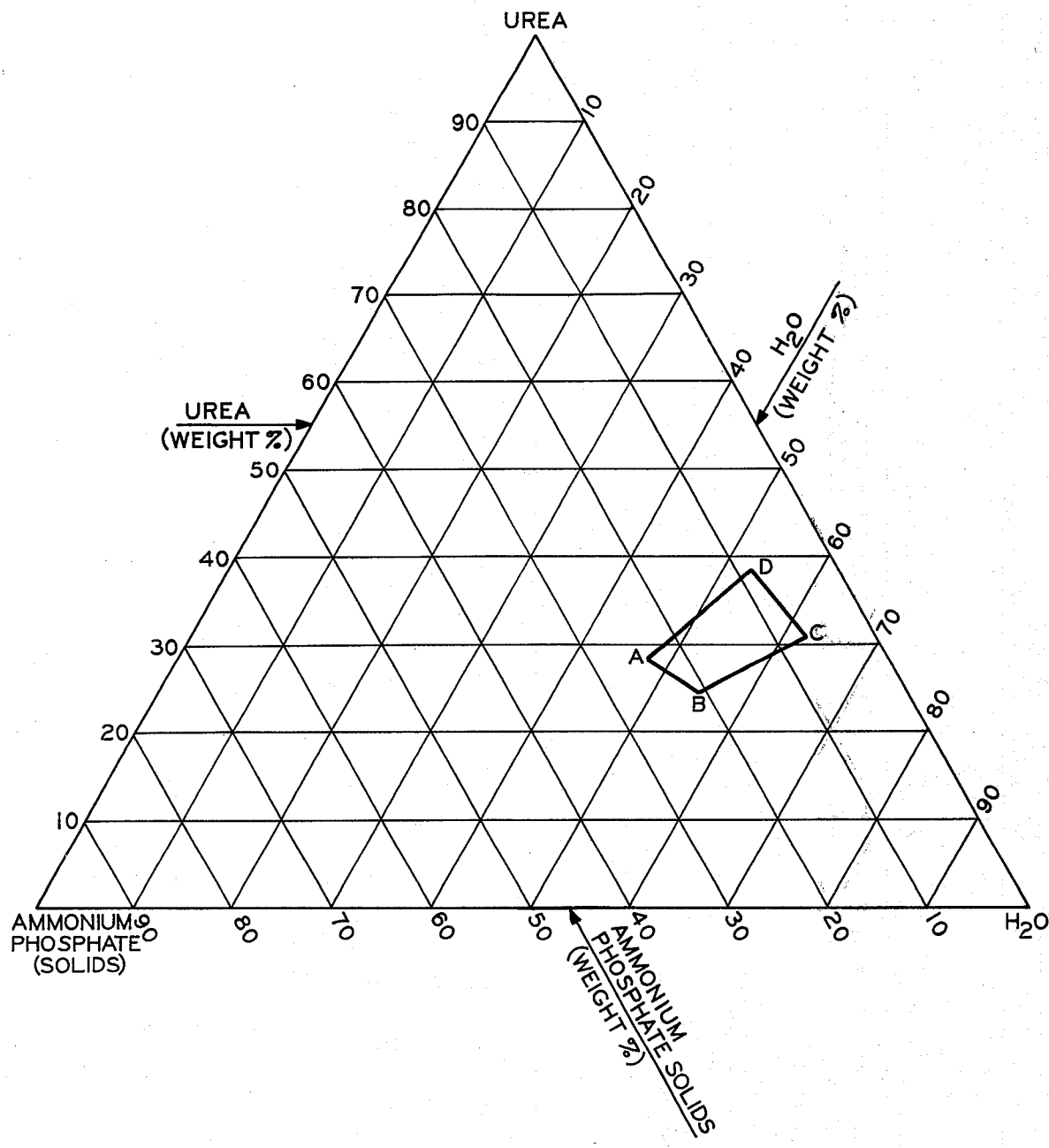

United States Patent [19]

Wilson et al.

[11] 3,940,494
[45] Feb. 24, 1976

[54] LIQUID RUMINANT FEED SUPPLEMENT

[75] Inventors: Joseph F. Wilson, Bartlesville, Okla.; Robert S. Parish, Henderson, Colo.

[73] Assignee: Phillips Petroleum Company, Bartlesville, Okla.

[22] Filed: July 29, 1974

[21] Appl. No.: 492,830

Related U.S. Application Data

[63] Continuation-in-part of Ser. No. 295,828, Oct. 10, 1972, abandoned, which is a continuation-in-part of Ser. No. 102,885, Dec. 30, 1970, abandoned.

[52] U.S. Cl. ................................................. 426/69
[51] Int. Cl.² ........................................... A23K 1/22

[58] Field of Search ............. 426/69, 213; 71/29, 30

[56] References Cited
UNITED STATES PATENTS 3,523,798    8/1970    Kail.................................. 426/213

Primary Examiner—Raymond N. Jones

[57]    ABSTRACT

A feed supplement consisting essentially of 100 parts by weight of dry urea, 22.1 to 46.4 parts by weight of ammonium phosphate solids and 126 to 174 parts by weight of water. In a further embodiment a feed supplement consisting essentially of urea, ammonium phosphate, molasses and water is disclosed.

3 Claims, 2 Drawing Figures

| POINT | UREA | AMMONIUM PHOSPHATE SOLIDS | $H_2O$ |
|---|---|---|---|
| A | 28.0 | 25.4 | 46.6 |
| B | 23.5 | 21.2 | 55.3 |
| C | 31.0 | 7.0 | 62.0 |
| D | 38.3 | 8.4 | 53.3 |

LIQUID RUMINANT FEED SUPPLEMENT

This is a continuation-in-part of our application Ser. No. 295,828, filed Oct. 10, 1972, which in turn is a continuation-in-part of application Ser. No. 102,885, filed Dec. 30, 1970, both now abandoned.

This invention relates to liquid ruminant feed supplement compositions. In another aspect, this invention relates to liquid supplement constituents which increase the utilization of non-protein-nitrogen compounds, convertible into organismal protein by ruminant animals. In yet another aspect, this invention relates to a liquid ruminant feed supplement composition characterized by low crystallization temperatures.

It has been recognized that non-protein nitrogenous compounds may be substituted for some of the protein in rations for ruminants. Some of the non-protein nitrogenous compounds which have been found to have high protein replacement values are urea and various ammonium salts. The addition of these compounds to livestock feed has been practiced for some time. Urea and the ammonium salts are economical and cost less than bona fide protein feed. These nitrogenous compounds when introduced to the rumen or pouch of an animal stimulate the microorganism present therein. Microorganisms in the stomach of the animal utilize the urea or ammonium salts to create protein. Protein is an essential constituent of all living cells, for the body tissues of all animals, muscle, internal organs, nervous systems, and external tissues are made up largely of protein materials. Animal life, accordingly, requires protein for growth, for replacement of body tissues and fluids and for the production of such animal products as milk, meat, and wool.

Heretofore, solutions containing a high content of urea have been shipped in heated containers or containers maintaining temperatures above the ambient in order to prevent crystallization. Such shipment involves higher transportation costs than materials which are liquid at ambient temperatures. As it may be some time between the mixing of a liquid supplement and its being made available to the ruminant, the liquid supplement is preferably not too viscous, does not crystallize, and is substantially immune to extremes of temperatures.

Urea in commercial form is crystalline, and it does not dissolve readily, especially at lower temperature ranges. Crystallization problems with urea and the various ammonium salts utilized as high protein supplements for ruminant animals continue to exist at relatively low ambient temperatures. The end use of the aforementioned supplement necessarily requires a solution wherein the supplements can be homogeneously dispersed with other feedstocks, for example, vitamins, roughage, and the like.

An object of this invention is to provide nitrogenous ruminant feed supplement compositions which can be maintained in a stable solution form over a period of time at relatively low ambient temperatures. Another object of this invention is to provide liquid ruminant feed supplement compositions characterized by relatively low crystallization temperatures. Other objects and advantages of this invention will become apparent to a person skilled in the art from the following detailed description of the invention, the appended claims and the drawing which shows two trilinear diagrams of the composition of the feed supplement.

We have discovered that certain nitrogenous compound solutions which have been found suitable for specialized applications in the chemical and fertilizer industries make excellent feed supplements for ruminants such as cattle, sheep, goats, and the like. These nitrogenous compounds constitute a class of aqueous, urea-ammonium polyphosphate solutions which can be readily shipped and stored in a liquid state due to their low crystallization temperatures. Ammonium polyphosphate is commonly supplied as a solution, 10-34-0 being commonly used. This solution is defined as an aqueous solution consisting of water and ammonium polyphosphate such as to have 10 weight percent nitrogen (N) and 34 weight percent $P_2O_5$. The 10-34-0 has 58.05 weight percent solids and 41.95 weight percent water. Wherever 10-34-0 is mentioned, this composition is meant. Calculations on dry basis are also included.

The liquid ruminant feed supplement compositions of this invention utilize aqueous carriers selected from water and/or water-molasses blends. These solutions are characterized by crystallization temperatures below about 40°F. Many of these solutions are limited due to high viscosities at temperatures above the crystallization temperature. The solutions of this invention have acceptable viscosities below about 50,000 centipoises. The aforementioned class of solutions is characterized by a pH of between about 6 and about 7 with the urea content acting as a buffering agent.

Solutions only slightly outside the indicated ranges of proportions have crystallization temperatures well above 40°F and, hence, cannot be shipped or stored as liquids whenever the temperature falls below this temperature. Solutions which could provide lower crystallization temperatures contain too little urea to provide the desired balance as required by ruminant animal nutritional demands. Within the range of compositions of this invention, the urea reduces the viscosity of the aqueous carrier utilized, thus alleviating problems resulting from, for example, molasses which can become highly viscous and difficult to handle under cool temperatures. Apparently, the aqueous molasses blends also function as solvents for the urea, thus sharply decreasing the crystallization temperatures.

This invention therefore resides in a composition consisting essentially of 24.2 to 35.0 weight percent dry urea, 26.6 to 38.6 weight percent molasses solids, 8.6 to 15.8 weight percent ammonium phosphate solids, and 25.4 to 27.9 weight percent water, said composition being characterized as having a temperature of crystallization less than +36°F, and a viscosity that is sufficiently low for pumping the mixture at some temperatures less than about +36°F. In another embodiment, the invention resides in a composition consisting essentially of 22.1 to 46.4 parts by weight ammonium phosphate solids per 100 parts by weight of dry urea, and 126 to 174 parts by weight water per 100 parts by weight dry urea, said composition being characterized as having a temperature of crystallization less than about +40°F and which remains liquid at temperatures as low as +32°F and some of which remain liquid at temperatures as low as +14°F. The words "consisting of" as used herein are intended to exclude any larger amount of additives (such as $CaCl_2$) or any additives which would destroy the desired properties. However, trace amounts of additives such as vitamins, hormones, minerals and stimulants for the growth of microflora can be present. The compositions may be applied to various solid feed materials or fed directly as a liquid to the ruminant.

Molasses derived from, for example, sugar cane, beets, citrus fruits, or corn, as those skilled in the art will understand, can also be admixed with the foregoing solutions displacing a portion of water thereof. In determining the amount of water present in the liquid ruminant feed supplement composition, the amount of water in the urea solution as well as the amount of water in the ammonium phosphate salt must be taken into consideration. The amount of water has a considerable effect upon crystallization temperatures of the aforementioned solutions at the lower temperatures. For example, an increase from about 25 to 28 weight percent total water lowers the crystallization temperature from about 32°F to about 9°F under the approximate ratio by weight of from 1:0.80 urea to 10-34-0 composition. Substituting molasses for a portion of the water has in effect improved the crystallization temperatures within the limits of the present invention. Apparently, the molasses also functions as a solvent for the urea, thus decreasing the crystallization temperature. Compositions of the aforementioned liquid ruminant feed supplement solutions contain the proper proportions of nitrogenous materials and can be readily transported in a tank car due to the aforementioned low crystallization temperatures for on site applications and mixing with carbohydrates and bulk feeds. The absence of acidic materials in the compositions greatly reduces corrosion of the storage vessels used. Various other urea feed supplement solutions have been made having compositions outside the above-defined range. These heretofore utilized compositions also have crystallization temperatures ranging far above the limitations set forth hereinabove and as exhibited by the composition of the present invention.

The term ammonium phosphate solids is used herein to designate the solids in the 10-34-0 or other ammonium phosphate solutions which are employed. In general, ammoniated phosphate solutions can be used which will supply the ammonium phosphate solids in the proper range of concentrations, such as, for example, 10-34-0, 11-37-0, solid ammonium phosphates or the ammonium phosphates can be prepared in situ by neutralizing phosphoric acids with ammonia. 11-37-0 is defined as an aqueous solution consisting of water and ammonium phosphate such as to comprise 11 weight percent nitrogen (N) and 37 weight percent $P_2O_5$.

The following Tables I and II further illustrate and define our invention as hereinabove descussed. Table I discloses seven example compositions of our invention wherein a portion of the aqueous carrier is comprised of 87.7° Brix molasses, for example, about 33 to 50 percent by weight. As can be seen from Table I, crystallization temperatures and viscosity limitations having temperatures below 40°F are characteristic of all seven compositions.

Table I is constructed on the basis of materials generally available commercially, i.e., 10-34-0 is a commonly available aqueous solution of ammonium polyphosphate, Brix molasses, a water-thinned molasses.

Table IA shows a breakdown of solids versus water considering the various sources given above.

Table II illustrates five compositions according to the compositions of our invention, all of which are characterized by crystallization temperatures of 40°F or below. The compositions of Table II use only water as the aqueous carrier and fully illustrate the preferred range of dry weight ratio, urea-to-ammonium polyphosphate compound to added water. Table IIA shows a breakdown of solids versus water based on the sources shown in Table II.

TABLE I

| Run | Dry g | Urea Wt. % | g | Added Water Wt. % | Brix g | 87.7° Molasses Wt. % | g | 10-34-0 Wt. % | °F at which Crystals Formed | °F High Viscosity Limit[3] |
|---|---|---|---|---|---|---|---|---|---|---|
| 1 | 15 | 28.8 | 5 | 9.6 | 20 | 38.5 | 12 | 23.1 | None at −5 | −5 |
| 3 | 15 | 26.3 | 5 | 8.8 | 25 | 43.9 | 12 | 21.0 | None at +1 | +1 |
| 4 | 15 | 24.2 | 5 | 8.1 | 30 | 48.3 | 12 | 19.4 | None at −25 | −25 |
| 6 | 15 | 27.3 | 5 | 9.1 | 20 | 36.3 | 15 | 27.3 | None at +9 | +9 |
| 2 | 21 | 35.0 | 7 | 11.7 | 20 | 33.3 | 12 | 20.0 | None at +26 | +26 |
| 5 | 15 | 30.0 | 5 | 10.0 | 20 | 40.0 | 10 | 20.0 | None at +36 | +36 |
| 7 | 15 | 31.9 | 5 | 10.6 | 20 | 42.6 | 7 | 14.9 | 33 | — |

[3] High viscosity limit is considered to be a mixture viscosity greater than that at which the mixture can be pumped.

TABLE IA

| | Urea Solution | | Solids and Water Breakdown 87.7° Brix[1] Molasses | | 10-34-0 Solution[2] Phosphate | | |
|---|---|---|---|---|---|---|---|
| No. | Dry Urea | Water | Solids | $H_2O$ | Solids | $H_2O$ | Total Water |
| 1 | 28.8 | 9.6 | 30.8 | 7.7 | 13.4 | 9.7 | 27.0 |
| 3 | 26.3 | 8.8 | 35.1 | 8.8 | 12.2 | 8.8 | 26.4 |
| 4 | 24.2 | 8.1 | 38.6 | 9.7 | 11.3 | 8.1 | 25.9 |
| 6 | 27.3 | 9.1 | 29.0 | 7.3 | 15.8 | 11.5 | 27.9 |
| 2 | 35.0 | 11.7 | 26.6 | 6.7 | 11.6 | 8.4 | 26.8 |
| 5 | 30.0 | 10.0 | 32.0 | 8.0 | 11.6 | 8.4 | 26.4 |
| 7 | 31.9 | 10.6 | 34.1 | 8.5 | 8.6 | 6.3 | 25.4 |

[1] 87.7° Brix molasses is 20% water
[2] 10-34-0 is 58.05 wt. % solids and 41.95 wt. % $H_2O$
All values in Table IA are weight percents.

TABLE II

| Run No. | Parts by Weight | | | Crystallization Temperature °F |
|---|---|---|---|---|
| | Urea | 10-34-0 | Added Water | |
| 1 | 100 | 38 | 110 | 40 |
| 2 | 100 | 38 | 120 | 30 |
| 3 | 100 | 50 | 110 | 17 |
| 4 | 100 | 50 | 120 | 14 |

TABLE II-continued

| Run No. | Parts by Weight | | | Crystallization Temperature °F |
|---|---|---|---|---|
| | Urea | 10-34-0 | Added Water | |
| 5 | 100 | 80 | 140 | 32 |

TABLE IIA

| Run No. | Solids and Water Breakdown | | |
|---|---|---|---|
| | Urea (dry) | Phosphate Solids | Total Water |
| 1 | 100 | 22.1 | 126 |
| 2 | 100 | 22.1 | 136 |
| 3 | 100 | 29.0 | 131 |
| 4 | 100 | 29.0 | 141 |
| 5 | 100 | 46.4 | 174 |

10-34-0 is 58.05 wt. % solids and 41.95 wt. % $H_2O$.

It is evident from the above examples that we have provided useful compositions of matter containing suitable urea-ammonium polysuperphosphate aqueous solution balance for use as a liquid ruminant feed supplement. The aforementioned supplement is characterized by low crystallization temperatures and can be shipped without requiring heated or insulated cars. Thus, the compositions of the invention can be readily transported and handled using standard pumping systems.

A study of the tables shows that where molasses is utilized, the composition is limited by either the temperature of crystallization of the composition or the viscosity of the composition which sharply increases to a value at which the mixture is not pumpable at very slight temperature changes to a lower temperature.

Figure 2:
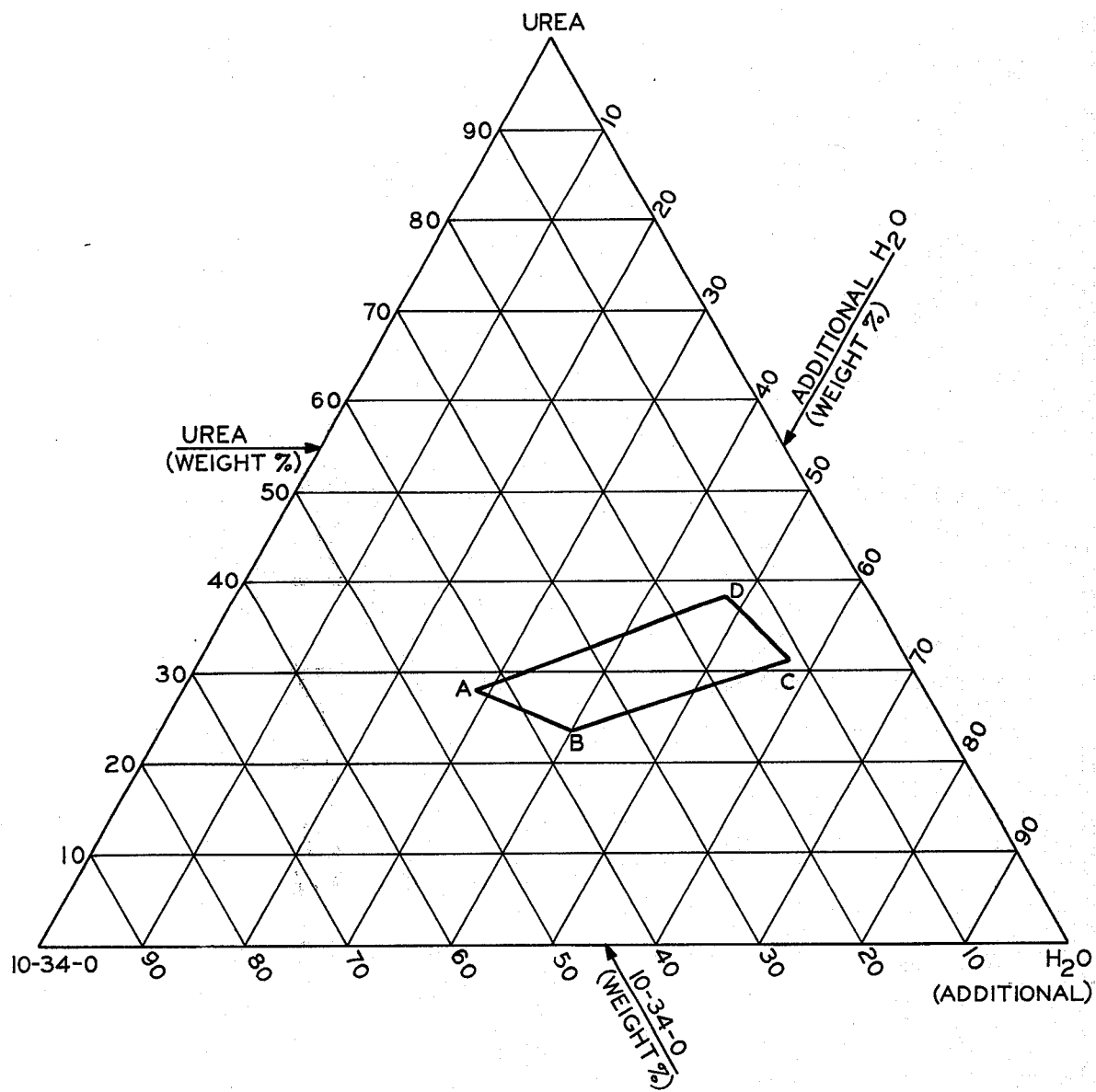

For a still better understanding of this invention the critical ranges of the liquid ruminant feed supplement are shown in the trilinear diagrams of FIGS. 1 and 2. The feed supplement, consisting essentially of water, urea and ammonium phosphate, has to have a composition of these three ingredients laying within the area defined by the quadrangle ABCD, a polygon having four corners defined by the weight percentages of urea, ammonium phosphate and water as follows:

| | Urea | Ammonium Phosphate Solids | Water |
|---|---|---|---|
| A | 28.0 | 25.4 | 46.6 |
| B | 23.5 | 21.2 | 55.3 |
| C | 31.0 | 7.0 | 62.0 |
| D | 38.3 | 8.4 | 53.3 |

This area is shown in FIG. 1.

The values above have been calculated from the points defining the area of compositions for a feed supplement made from urea, 10-34-0 and water. Since 10-34-0 contains 41.95 weight percent of water and 58.05 weight percent of ammonium phosphate solids, the quadrangle shown in FIG. 2 has a shape different from the area shown in FIG. 1, which is independent of the ammonium phosphate composition. The four corners ABCD of the polygon shown in FIG. 2 are defined by the weight percentages of urea, 10-34-0 and additional water as follows:

| | Urea | 10-34-0 | Additional Water |
|---|---|---|---|
| A | 28.0 | 43.8 | 28.2 |
| B | 23.5 | 36.6 | 39.9 |
| C | 31.0 | 12.0 | 57.0 |
| D | 38.3 | 14.5 | 47.2 |

The lines A-D and B-C are actually crystallization temperature isotherms, A-D corresponding to a crystallization temperature of 32°F and B-C to one of 9°F; these isotherms are not quite straight; however the straight lines shown constitute a very good approximation, which is believed to be sufficient for the purpose of defining this invention.

Reasonable variations and modifications, which will be apparent to those skilled in the art, can be made in this invention without departing from the spirit and scope thereof.

We claim:

1. A composition of matter consisting essentially of urea, ammonium phosphate and water, the weight percentages of the constituents being such as to fall within the polygon of four corners ABC and D drawn in a trilinear diagram defined by the weight percentages of the constituents as follows and as shown in FIG. 1:

| | Urea | Ammonium Phosphate Solids | Water |
|---|---|---|---|
| A | 28.0 | 25.4 | 46.6 |
| B | 23.5 | 21.2 | 55.3 |
| C | 31.0 | 7 | 62.0 |
| D | 38.3 | 8.4 | 53.3 |

2. Liquid animal feed supplement consisting essentially of:
urea, 22.1 to 46.4 parts by weight ammonium phosphate solids per 100 parts by weight urea and 126 to 174 parts by weight of water per 100 parts by weight of urea, the urea being calculated as urea in the water free state, said supplement having a crystallization temperature less than about 40°F.

3. Liquid animal feed supplement consisting essentially of:
24.2 to 35.0 weight percent of urea calculated as urea in the water free state, 26.6 to 38.6 weight percent molasses solids, 8.6 to 15.8 weight percent ammonium phosphate solids, and 25.4 to 27.9 weight percent of water, said liquid feed supplement having a temperature of crystallization less than +36°F. and a viscosity that is sufficiently low for pumping the mixture at temperatures less than about 36°F.

* * * * *